United States Patent [19]

Jonsson et al.

[11] Patent Number: 4,587,734

[45] Date of Patent: May 13, 1986

[54] GRATING TOOL

[76] Inventors: Jan Jonsson, Hantvernsvägen 8, 18400 Auersberga; Ernst A. O. Strömberg, Wittstocusgatan 3b, 11524 Stockholm, both of Sweden

[21] Appl. No.: 593,856

[22] Filed: Mar. 27, 1984

[51] Int. Cl.⁴ .............................................. B26B 3/00
[52] U.S. Cl. .................... 30/279 R; 30/280; 30/325
[58] Field of Search ............ 30/169, 279 R, 280, 30/281, 325, 314, 299; 15/236 R; 99/540

[56] References Cited

U.S. PATENT DOCUMENTS

| | | | |
|---|---|---|---|
| 411,568 | 9/1889 | Becker | 30/279 R |
| 423,150 | 3/1890 | Haines | 30/279 R |
| 2,166,013 | 7/1939 | McLindon | 30/340 A X |
| 2,266,278 | 12/1941 | Senkewitz | 30/280 |

FOREIGN PATENT DOCUMENTS 2508 of 1904 United Kingdom .................. 30/169

Primary Examiner—Douglas D. Watts
Attorney, Agent, or Firm—Burns, Doane, Swecker & Mathis

[57] ABSTRACT

A cheese grating tool comprises a handle shaft (1) and a plate (2) connected thereto. The plate (2) comprises a generally single-curved portion (22) with a plurality of apertures (31) which are distributed over the width of the blade (2) generally in the region of said curved portion which is remote from the handle shaft. Each of said apertures is delimited by a scope (32), which projects from the convex side of the curved plate portion (22). The scopes are parallel as seen in the plate plane and the scope edges face generally toward the handle shaft. The scope axis extends obliquely to the adjacent plate surface.

3 Claims, 4 Drawing Figures

GRATING TOOL

TECHNICAL FIELD

The present invention refers to a manual grating tool, especially for grating a material such as cheese and comprising a handle and a plate connected to the handle, said plate having a plurality of apertures delimited by scoops which project obliquely from one side of the plate, face the same way and are arranged extending in parallel in the plane of the plate, the projecting edges of the scopes being cutting edges.

BACKGROUND OF THE INVENTION

In order to season dishes with cheese or make cheese gratin dishes, it is a normal procedure to grate thin strips or chips from a chunk of so called hard cheese. The strips melt easily even if there is relatively thick layer or large mass of cheese strips in or on the dish, and this in contrast to the long time required for the melting of cheese slices in a dish which is heated.

In order to grate the cheese for forming such strips, it is common practice to use a grater of the type and design stated in the first paragraph of this specification. When using such a common grater, a suitably sized chunk of cheese is cut from the cheese piece, and the chunk is reciprocated by hand along the grater. The cutting of the cheese chunk often ruins the appearance and practical size of the cheese piece and, the chunk is easily broken during the grating operation, moreover an unusable chunk must normally be left, and finger injuries are often experienced. Alternatively one can try to hold the entire cheese piece in one hand and to reciprocate it on the grater, while holding it by the other hand, but the cheese piece is normally heavy and often weighs around one pound, and substantial power must be exerted for the grating work, which is tiresome and not easily controllable. Generally, the work with a conventional grater is messy.

Mill-type grating devices are also known, which can be used for grating cheese, but the disadvantages are again that a chunk must be cut from the cheese piece, that an unusable chunk normally is left, and moreover, there is the trouble of washing the device, which cannot easily be washed in a dish washing machine.

An object of the invention is to provide a simple grating tool, primarily for cheese, which avoids or reduces the above drawbacks and which effectively can be used on a cheese piece without the necessity of moving the cheese piece, and without the necessity of cutting a chunk to be grated from the cheese piece.

Other objects and advantages of the invention are mentioned or appreciated by the reader of the following specification.

SUMMARY OF THE INVENTION

The inventive tool for manual grating of primarily cheese, can be said to be based on a conventional grater, i.e. a structure comprising handle and a plate connected to the handle, said plate having a plurality of apertures which are delimited by scoops, which project obliquely from one side of the plate, face the same way, and are arranged extending in parallel in the plane of the plate, the projecting edges of the scopes being cutting edges. On these bases the inventive improvements comprise that the plate has a substantially single-curved portion, that a plurality of said apertures are arranged in the curved plate portion, the scoops projecting from the convex side of the curved plate portion, and that the scoops stand in a direction which is substantially at right angle to the generatrice of the curved portion.

In a preferred embodiment of the tool, the blade or plate comprises a substantially flat plate portion which continuously joins the curved potion at the border thereof facing away from the handle, and wherein said apertures are arranged also in the area of the flat plate portion, which adjoins the curved portion. Said flat plate portion normally comprises a non-apertured lip area, which, when led in a parallel on top of the cheese piece, defines the right operation angle of the tool relative to the cheese piece.

By having the scoops and apertures distributed over the curved plate portion, the grating is performed in a plurality of top layers of the cheese piece during one and the same work stroke of the tool. As a result, the grating speed is enhanced. Moreover, the tool can perform an effective grating even when the surface of the cheese piece is not flat. Consequently the cheese piece can be shaped during the grating operation to a desired shape, for example one suitable for optimizing the cutting of cheese slices to be used in sandwiches of the like.

Preferably the handle is a generally straight shaft, the axis of which is substantially at right angle to the generatrix of the curved plate portion. Preferably the scoops project generally toward the handle. Moreover, the plate is preferably arranged and adapted to collect the cheese gratings formed.

The working stroke of the tool can be either a pulling motion or pushing motion, it is of advantage to have the handle shaped and arranged to permit the operator to easily push the blade onto the surface of the cheese piece, and for that purpose it is of advantage to have the handle extending at right angle to the generatrice of the curved portion. The arrangement accommodates the simultaneous pressing of the blade onto the cheese surface and the linear pulling or pushing of the tool in the handle direction.

The apertures are suitably distributed over the whole width of the plate, and the apertures are suitably arranged in rows which extend in parallel to said generatrice, the holes of the rows being arranged at equal intervals, and the holes of adjacent rows preferably being displaced in the row direction distance corresponding to half said interval. Preferably the intervals are chosen to be of the same order as the width of the holes, as viewed in the plate plane.

The tool is preferably symmetrical in relation to the longitudinal axis of the handle.

The tool blade can consist of a thin plate of stainless steel. With a view to the formation of the apertures and scopes, the metal plate should be as thin as possible, but on the other hand the structural stability of the blade must be kept. If the plate thickness is optimized with relation to the formation of the apertures and scopes, a corrugation should be formed around the edge portion of the plate in order to stabilize the blade. The blade can comprise generally triangular plate portion, the base of which is connected to said curved plate portion and the top of which is connected to the handle. Then a corrugation could be formed also along the height of said triangular portion in order to stabilize the blade. The corrugations have their concave surfaces facing the same way as the concave side of the curved portion. A rod could be fixed to the handle and extend in the corrugation of the triangular plate portion. Said central corrugation in the triangular plate portion can of course extend also into the adjoining part of the curved plate portion.

Normally the scoops are arranged so that their cutting edges generally face toward the handle, so that said flat plate portion or lip also constitutes a collection area for the strips formed by the grater.

In the following the inventive tool will be described in the form of an example on an embodiment, with reference to the appended drawings.

DETAILED DESCRIPTION OF THE PREFERRED EMBODIMENT

Figure 1:
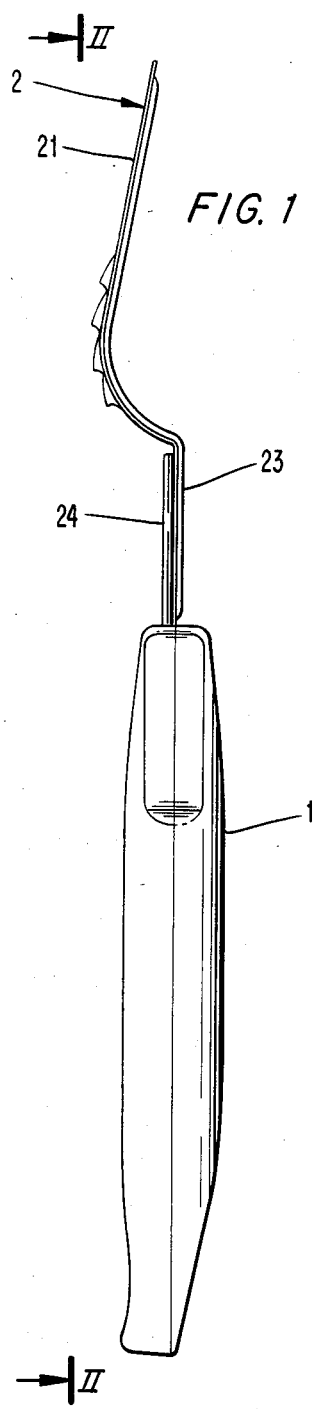
FIG. 1 shows a side view of a tool constructed in accordance with the claimed invention.
Figure 2:
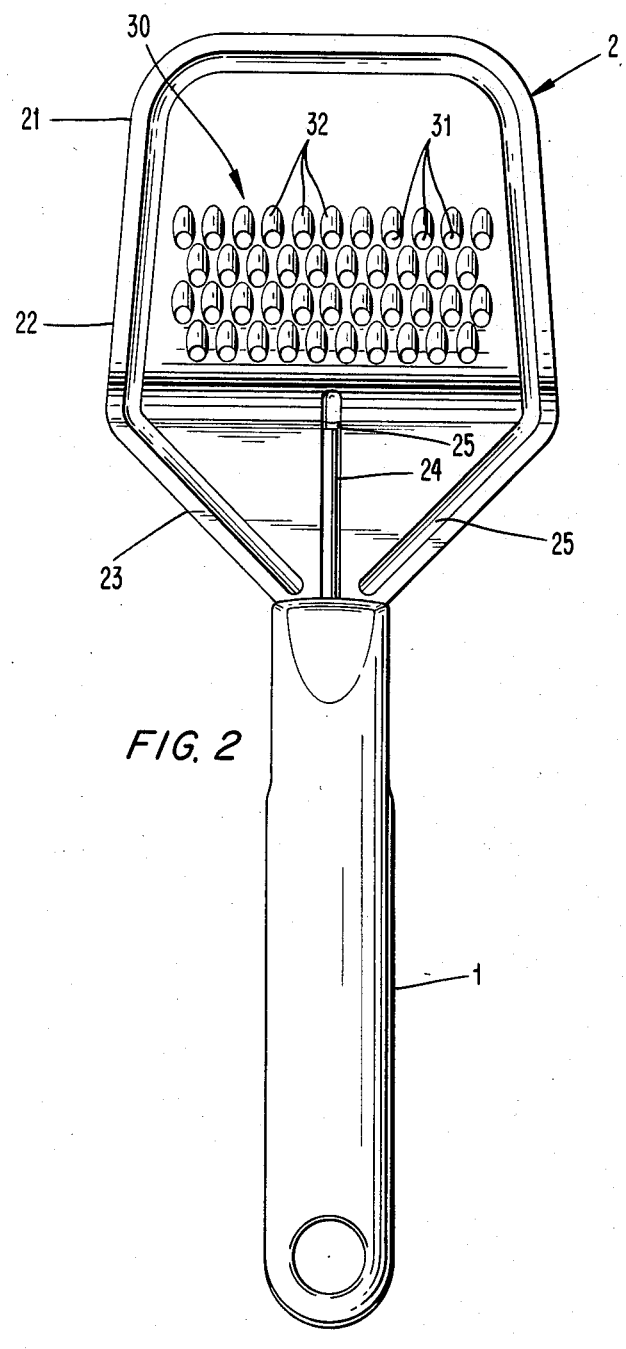
FIG. 2 shows a view taken along line II—II in FIG. 1.

In FIGS. 1 and 2 there is shown a tool comprising a handle 1 to which a blade 2 is connected. The blade 2 is preferably of stainless steel, and the shaft 1 is of a plastics material, which can withstand the environment in a dish washing machine. The tool is symmetrical relative to the axis of the shaft 1. The blade 2 comprises a flat portion 21, a single curved portion 22, and a flat triangular portion 23. In the region bridging the curved portion 22 and the flat lip portion 21, there are a plurality of apertures 31, which are distributed substantially over the width of the blade 2. The apertures 31 are arranged in parallel rows which are parallel to the generatrix of the curved portion 22. The interval between the holes of a row is regular, and the holes of adjacent rows are mutually displaced in order to optimize the aperture covering in the longitudinal direction of the tool.

Figure 3:
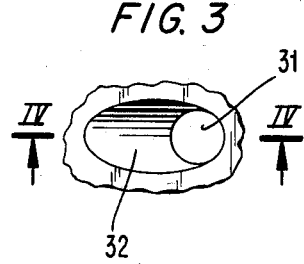
FIG. 3 illustrates a detail view of a portion of the tool blade having an aperture delimited by a scoop.
Figure 4:
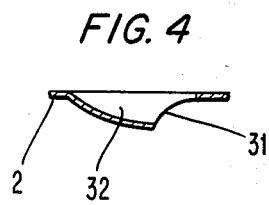
FIG. 4 shows a section taken along line IV—IV in FIG. 3.

As can be seen from FIGS. 3 and 4, each aperture is delimited by a scoops 32 which has been punched out of the plane of the blade 2 so that the edge 33 of the scoops forms a cutting edge which also defines part of the aperture 31.

As can be seen in the drawings, the blade 22 is thin, and therefore, a corrugation 25 has been formed around the circumference of the blade, and also in the central part of the triangular blade portion 23 and into the adjoining part of the curved portion 22. The convex side of the corrugation 25 faces the same way as the convex side of the curved portion 22. A rod 24 which is fixed in the shaft 1, is located in the central corrugation of the triangular blade portion 23, and is spot welded thereto, in order to stabilize the blade related to the shaft 1.

The blade can be made thereby that a flat sheet metal piece is cut to the configuration shown in FIG. 2 and is provided with holes 31, whereafter the sheet metal blank is punched so as to form the corrugations 25 and the scopes 32, whereafter the blade is bent to the curvature shown in FIG. 1.

It is appreciated that several modifications can be made in the embodiment shown, such as shortening the flat blade portion 21, and altering the connection angle between the blade portions 23 and 22 and also with respect to the distribution of the apertures. Moreover, it should be noted that it is within the scope of the invention to make the blade 2 from sheet material which has sufficient strength to permit deletion of the corrugations 25 illustrated on the embodiment example.

An advantage of the inventive grater is that the grating area of the tool is defined and relatively small. This means that the grating force exerted by the operator is rendered independent of the total area of the cheese surface at which the grating is performed. In contrast, conventional grating plates have grating areas which cover the entire plate surface and are larger in area than surface of the cheese piece.

Another advantage of the inventive grater is that the smooth blade tip portion which is to lie flat on the cheese surface, defines a suitable grating attack angle.

The convexly curved blade portion with grating permits effective grating scoops of the present invention even when the cheese surface is convexly curved as can occur when tapered slices are cut, because the cheese piece is more compact toward the border of the cheese from which the piece was cut.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A tool for manual grating of a material such as cheese, comprising:
    an elongated handle having a longitudinal axis; and
    a blade connected to a forward end of said handle, said blade including a single-curved blade portion which is defined by a generatrix, said generatrix being at a substantially right angle with respect to said longitudinal axis, a connecting blade portion extending in the direction of said longitudinal axis from said forward end of said handle to said curved blade portion so as to space said curved blade portion from said forward end of said handle, said curved blade portion intersecting said connecting blade portion at an angle so that said curved blade portion arcs downwardly from said connecting blade portion, an upwardly inclined flat blade portion extending substantially continuously from said curved blade portion, and rows of apertures in adjoining regions of said curved blade portion and of said flat blade portion, said rows extending parallel to said generatrix, each aperture being delimited by a scoop, each scoop projecting obliquely from a side of said blade defining a convex side of said curved blade portion, each scoop extending in a direction substantially at a right angle to said generatrix and generally toward said handle, each scoop having a projecting cutting edge, the apertures of the rows being arranged at regular intervals, the apertures of adjacent rows being displaced in the row direction, said flat blade portion including a forward lip region free of apertures so that said forward lip region is adapted to collect cheese gratings and to guide the blade.

2. The tool according to claim 1, wherein said connecting blade portion is substantially triangular and planar and said blade includes a reinforcing corrugation about a perimeter of said blade.

3. The tool according to claim 2, wherein said tool includes a rod extending from said handle substantially to said curved blade portion, said triangular connecting blade portion having a corrugation for receiving said rod, said corrugation extending into said curved blade portion.

* * * * *